(12) United States Patent
Sakota et al.

(10) Patent No.: US 7,896,194 B2
(45) Date of Patent: Mar. 1, 2011

(54) NUT FEEDING METHOD AND NUT FEEDER

(75) Inventors: Kouji Sakota, Hatsukaichi (JP); Seiji Miura, Hatsukaichi (JP)

(73) Assignee: Seki Kogyo Co., Ltd, Hiroshima (JP)

( * ) Notice: Subject to any disclaimer, the term of this patent is extended or adjusted under 35 U.S.C. 154(b) by 663 days.

(21) Appl. No.: 11/872,512

(22) Filed: Oct. 15, 2007

(65) Prior Publication Data

US 2008/0245808 A1    Oct. 9, 2008

(30) Foreign Application Priority Data

Apr. 3, 2007    (JP) ................. 2007-097274

(51) Int. Cl.
*A01C 9/00*    (2006.01)

(52) U.S. Cl. .................... 221/213; 198/468.4

(58) Field of Classification Search ............... 221/213, 221/236, 268, 778; 198/468.4, 617; 222/375
See application file for complete search history.

(56) References Cited

U.S. PATENT DOCUMENTS

| | | | | |
|---|---|---|---|---|
| 2,763,173 | A * | 9/1956 | Bailey et al. ............... 81/57.37 |
| 4,020,316 | A * | 4/1977 | Schaft et al. ............... 219/103 |
| 5,007,795 | A * | 4/1991 | Yoshimura .................. 414/737 |
| 5,067,763 | A * | 11/1991 | Aoyama ...................... 294/65.5 |
| 5,191,691 | A * | 3/1993 | Aoyama ...................... 29/281.4 |
| 5,230,141 | A * | 7/1993 | Aoyama ........................ 29/719 |
| 5,359,171 | A * | 10/1994 | Aoyama ........................ 219/93 |
| 5,895,584 | A * | 4/1999 | Sakota ...................... 219/86.24 |
| 6,874,655 | B2 * | 4/2005 | Aoyama et al. ............. 221/213 |
| 7,559,435 | B2 * | 7/2009 | Miura et al. ................ 221/213 |
| 2005/0056683 | A1 | 3/2005 | Miura et al. |

FOREIGN PATENT DOCUMENTS

| | | |
|---|---|---|
| JP | 60-99086 U | 7/1985 |
| JP | 2-307684 A | 12/1990 |
| JP | 9-38780 A | 2/1997 |
| JP | 3309245 B2 | 5/2002 |
| JP | 2005-111559 A | 4/2005 |
| JP | 2006-75899 A | 3/2006 |

OTHER PUBLICATIONS

Japanese Office Action mailed Jan. 27, 2009 from corresponding Japanese Patent Application No. 2007-097274.
Examiner's Report dated May 6, 2009 from corresponding Canadian Patent Application No. 2,608,037.

* cited by examiner

*Primary Examiner*—Douglas A Hess
(74) *Attorney, Agent, or Firm*—Roberts Mlotkowski Safran & Cole P.C.

(57) ABSTRACT

A small-diameter front-end portion of a feed rod is allowed to enter into the screw hole of a nut delivered by a nut chute, and the nut is fed to an intended position by the forward movement of the feed rod. When an abnormal nut having a screw hole into which the small-diameter front-end portion cannot be inserted is delivered, the abnormal nut is prevented from being flicked by the feed rod. In order to achieve this, in a standby state, the small-diameter front-end portion of the feed rod enters a nut receiving chamber and is then stopped. On condition that the abnormal nut is received in the nut receiving chamber, if the feed rod moves forward to enter into the standby state, the abnormal nut is slightly pushed out forward from the nut receiving chamber.

4 Claims, 9 Drawing Sheets

NUT FEEDING METHOD AND NUT FEEDER

CROSS-REFERENCE TO RELATED APPLICATION

This application claims priority under 35 USC 119 to Japanese Patent Application No. 2007-97274 filed on Apr. 3, 2007, the entire contents of which are incorporated herein by reference.

BACKGROUND OF THE INVENTION (1) Field of the Invention

The present invention relates to nut feeding methods and nut feeders.

(2) Description of Related Art

An exemplary nut feeder adopted for nut resistance welding or other purposes is disclosed in Japanese Unexamined Patent Application Publication No. 2005-111559. The nut feeder includes a feed rod provided at its front end with a small-diameter portion insertable into the screw hole of a nut and a supply tube for supplying nuts to this feed rod. For this nut feeder, a nut is delivered toward the front of the feed rod put on standby through the supply tube, the feed rod is set in motion and thus moves forward so that the small-diameter portion is inserted into the screw hole of the nut, and the nut is fed as it is to an intended position, such as the position of a part of a workpiece to which the nut is to be welded.

Meanwhile, when an abnormal nut having a smaller diameter than a normal nut is delivered from a nut delivery unit, such as a supply tube, this abnormal nut needs to be prevented from being fed to the intended position. To cope with this, the following technique is disclosed in Japanese Patent No. 3309245: When an abnormal nut whose thread hole has a smaller diameter than a small-diameter front-end portion of a feed rod is delivered toward the front of the feed rod, the small-diameter front-end portion cannot be inserted into the screw hole, and therefore the abnormal nut is flicked forward by the small-diameter front-end portion so as to be prevented from being fed to an intended position.

Furthermore, the following technique is disclosed in Japanese Unexamined Patent Application Publication No. 2006-75899: A shoulder between a large-diameter basal portion of a feed rod and a small-diameter front-end portion thereof engages with a nut subsequent to an abnormal nut, thereby blocking the forward movement of the feed rod and thus preventing the feed of the abnormal nut.

SUMMARY OF THE INVENTION

However, in the case of Japanese Patent No. 3309245, abnormal nuts flicked by a feed rod are scattered over the surrounding area. Furthermore, the abnormal nuts may collide with a forward workpiece or the like, and consequently the workpiece or the like may be damaged.

Furthermore, in the case of Japanese Unexamined Patent Application Publication No. 2006-75899, since a feed rod moves forward from its standby position with great force, the nut subsequent to an abnormal nut is sometimes flicked by the feed rod and returned to a supply tube. This phenomenon becomes apparent when the number of nuts delivered from the supply tube and stored at the position at which a nut is received (hereinafter, referred to "nut receiving position") becomes small. Under the above-mentioned phenomenon, the feed rod moves forward as it is without engaging with the subsequent nut, resulting in the abnormal nut flicked by the feed rod.

An object of the present invention is to prevent the feed of an abnormal nut without flicking the abnormal nut.

In order to solve this object, the present invention is configured such that a feed rod is put on standby with its small-diameter front-end portion allowed to enter the nut receiving position without, in order to feed a nut, being located to the front of the nut.

More particularly, the present invention provides a nut feeding method, wherein a nut delivered by a nut delivery unit is received in a nut receiver, a small-diameter front-end portion of a feed rod is inserted into the screw hole of the nut, and the nut is fed to an intended position by the forward movement of the feed rod, and in a standby state for feeding the nut to the intended position, the small-diameter front-end portion of the feed rod enters a nut receiving position in the nut receiver so as to be inserted into the screw hole of the nut received in the nut receiver and is then stopped. The method includes the steps of: the forward movement step of moving the feed rod in the standby state forward in order to feed the nut from the nut receiver to the intended position; the backward movement step of moving the feed rod behind the nut receiving position in order to receive the subsequent nut from the nut delivery unit in the nut receiver; and the standby step of moving the feed rod forward to enter into the standby state and stopping the feed rod.

In view of the above, in the forward movement step, the feed rod feeds the previous nut from the nut receiver to the intended position, subsequently once moves behind the nut receiving position in order to allow the subsequent nut to be received at the nut receiving position, and then moves forward again so as to be put on standby. In the standby step in which the feed rod is put on standby, when such an abnormality that the small-diameter front-end portion of the feed rod cannot be inserted into the screw hole of a nut has occurred (for example, a nut having a screw hole whose diameter is smaller than that of the small-diameter front-end portion of the feed rod is delivered to the nut receiving position), the abnormal nut is pushed out forward from the nut receiving position by the feed rod. In this case, in the standby step, the small-diameter front-end portion of the feed rod only enters the nut receiving position. Therefore, the abnormal nut is not flicked forward intensely. This can prevent the abnormal nut from being fed to the intended position without scattering abnormal nuts over the surrounding area and causing damage to a forward workpiece or the like due to a collision of the abnormal nut with the workpiece or the like.

A nut feeder suitable for use in the nut feeding method includes: a nut delivery unit for delivering a nut; a nut receiver for receiving the nut delivered by the nut delivery unit; a feed rod which includes a small-diameter front-end portion insertable into the screw hole of the nut, whose forward movement allows the nut in the nut receiver to be fed to an intended position, and in which, in a standby state for feeding the nut to the intended position, the small-diameter front-end portion of the feed rod enters a nut receiving position in the nut receiver so as to be inserted into the screw hole of the nut received in the nut receiver and is then stopped; and a rod driver for moving the feed rod forward from the standby state to feed the nut to the intended position, subsequently moving the feed rod behind the nut receiving position in order to receive the next nut from the nut delivery unit in the nut receiver, and subsequently moving the feed rod forward again to enter into the standby state and then stopping the feed rod.

In view of the above, with the actuation of the rod driver, the state of the feed rod is shifted from the standby state in which the small-diameter front-end portion of the feed rod enters the nut receiving position to the original standby step through the execution of the above-described forward movement step, backward movement step and standby step. When such an abnormality that the small-diameter front-end portion of the feed rod cannot be inserted into the screw hole of a nut has occurred, the abnormal nut is only pushed out forward from the nut receiving position in the standby step in which the feed rod is put on standby. Therefore, the abnormal nut is not flicked forward intensely.

In the nut feeder, the feed rod is preferably provided with an engagement portion for, when the small-diameter front-end portion of the feed rod pushes the nut in the nut receiver out forward without being inserted into the screw hole of the nut so that the feed rod enters into the standby state, engaging with the nut subsequent to the pushed-out nut to prevent the feed rod from further moving forward from the standby state.

More particularly, the feed rod engages with the subsequent nut not in the dynamic state in which it is moving forward, but when the feed rod attempts to further move forward from the static state in which the previous nut has been pushed out so that the feed rod has been on standby, i.e., in which the feed rod has been stopped. This prevents the nut from being flicked by the feed rod in the engagement of the feed rod. Advantageously, the feed rod and the nut engage with each other with reliability. Since the forward movement of the feed rod is blocked by this engagement, the previous abnormal nut (for example, an abnormal nut having a small diameter) can be appropriately removed. Then, the engagement can be released so that the feed rod can be put on standby again.

It is preferable that the nut feeder further includes an abnormality detector for, when the feed rod enters into the standby state, detecting whether or not the nut in the nut receiver is pushed out forward by the feed rod. In this case, when the pushing out of the nut is detected by the abnormality detector, the actuation of the rod driver is preferably stopped.

More particularly, when the nut in the nut receiver is pushed out forward by the feed rod on condition that the feed rod is put on standby, this means that an abnormality in which the small-diameter front-end portion of the feed rod cannot be inserted into the screw hole of the nut has occurred. In this case, the actuation of the rod driver is stopped. In view of the above, the previous abnormal nut (for example, an abnormal nut having a small diameter) can be appropriately removed so that the feed rod can be put on standby again.

In the nut feeder, the nut receiver is preferably provided with a nut outlet passing through the nut receiver, extending toward the intended position and blocked by a door which can be opened by pivoting forward. When the forward movement of the feed rod allows the nut to move forward, the door is preferably biased, with a predetermined bias force, in its closing direction and can be opened forward by the push of the nut against the door, and when the small-diameter front-end portion of the feed rod pushes the nut in the nut receiver out forward without being inserted into the screw hole of the nut so that the feed rod enters into the standby state, the bias force given to the door preferably allows the nut to be held while being sandwiched between the door and the small-diameter front-end portion of the feed rod.

In view of the above, on condition that the feed rod is put on standby, if an abnormality in which the small-diameter front-end portion of the feed rod cannot be inserted into the screw hole of the nut in the nut receiver has occurred, the abnormal nut is held while being sandwiched between the feed rod and the door. This prevents the abnormal nut from being scattered over the surrounding area.

DETAILED DESCRIPTION OF THE INVENTION

An embodiment of the present invention will be described hereinafter with reference to the drawings. Note that the following description of the preferred embodiment is merely illustrative in nature and is not intended to limit the scope, applications and use of the invention.

Figure 1:
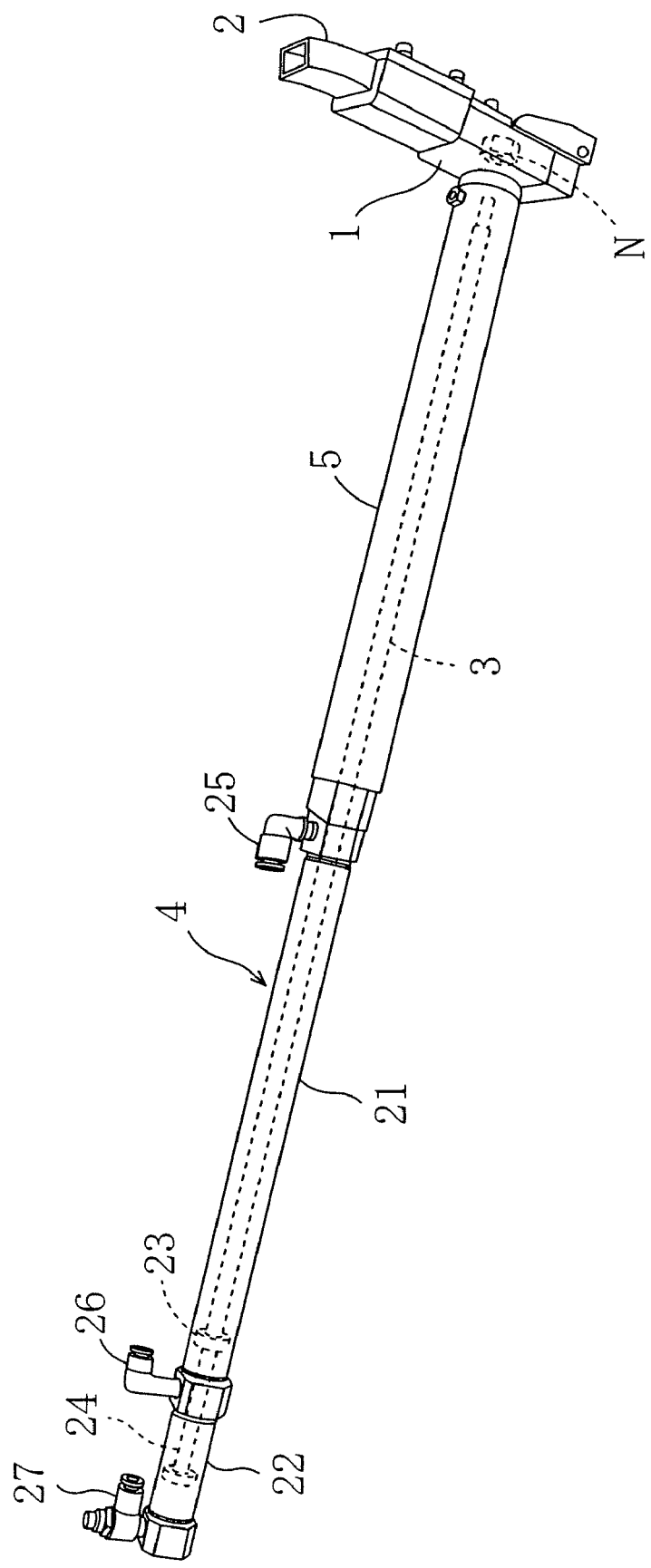
FIG. 1 is a perspective view illustrating a nut feeder according to the present invention.

FIG. 1 illustrates a nut feeder for feeding, to an intended position (such as the position of a part of a workpiece (not shown) to which a nut N is to be welded), the nut N to be welded to the workpiece. For this nut feeder, reference numeral 1 denotes a nut receiver placed back from the intended position, reference numeral 2 denotes a nut chute (only its lower part is shown) serving as a nut delivery unit for delivering the nut N to the nut receiver 1, reference numeral 3 denotes a feed rod for feeding, to the intended position, the nut N delivered to the nut receiver 1, and reference numeral 4 denotes a rod driver for driving the feed rod 3.

<Nut Receiver>

Figure 2:
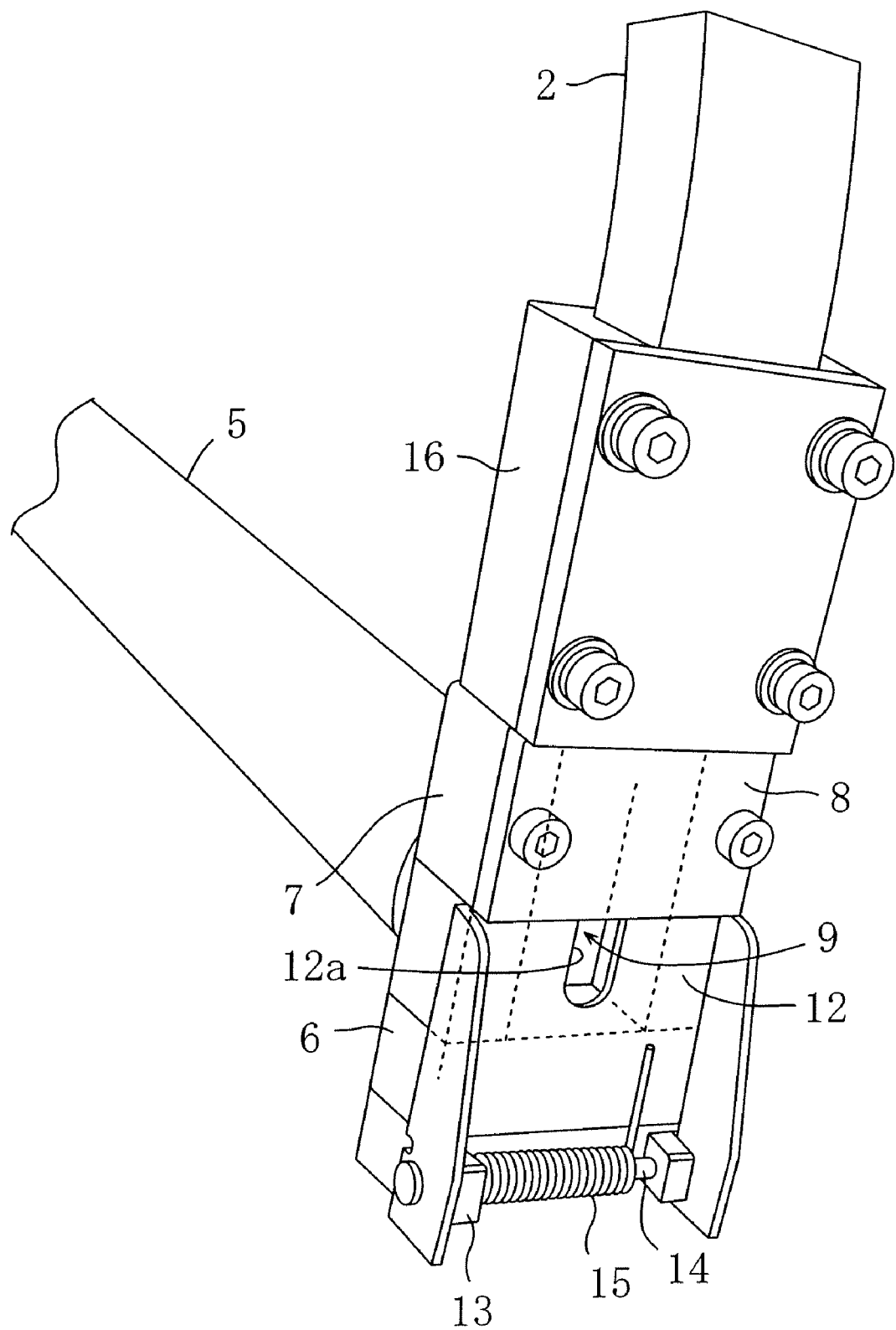
FIG. 2 is a perspective view illustrating a nut receiving part of the nut feeder.
Figure 3:
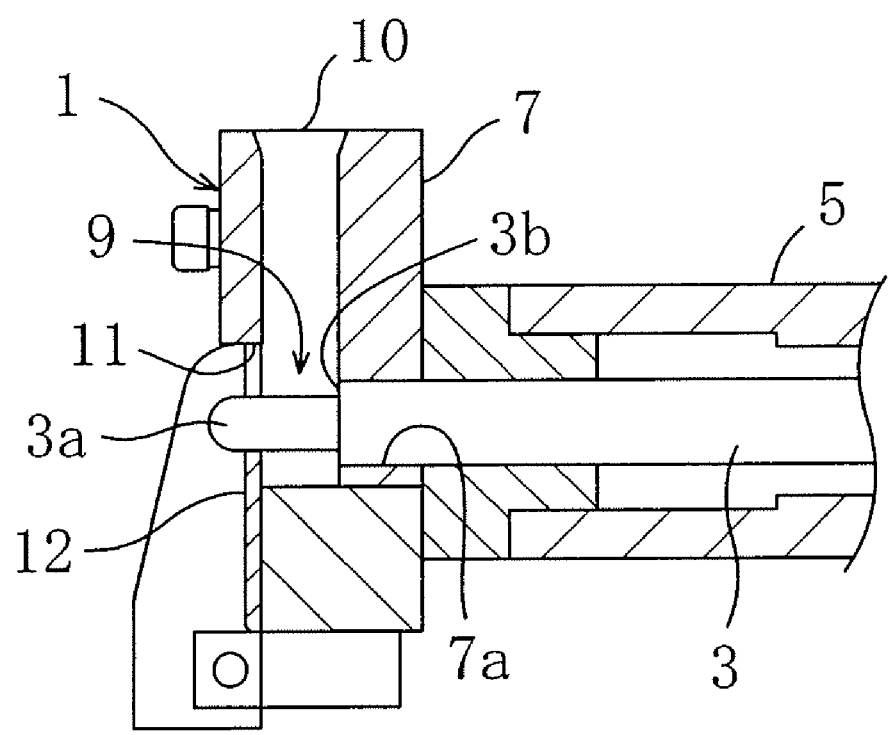
FIG. 3 is a longitudinal cross-portional view of the nut receiving part of the nut feeder.

As illustrated in FIGS. 2 and 3, the nut receiver 1 includes a stopper 6 for receiving a nut N delivered from the nut chute 2. A nut receiving chamber 9 is defined by this stopper 6, a channel member 7 placed on the stopper 6 and extending vertically, and a front plate 8 for blocking an opening in the front side of the channel member 7 from outside. A rod passage 7a through which the feed rod 3 moves in and out is formed in the channel member 7.

The top end of the nut receiving chamber 9 is opened to form a nut entrance 10 for admitting nuts N from the nut chute 2, and the front side thereof is opened between the stopper 6 and the front plate 8 to form a nut exit 11. The nut exit 11 is opposed to the rod passage 7a and blocked by a door 12 which can be opened by pivoting forward. More particularly, space between two bearing members 13 located immediately below the stopper 6 is spanned with a hinge axis 14. A lower end part of the door 12 is supported by the hinge axis 14 so that the door 12 can be opened by pivoting forward. The door 12 is biased, by a kick spring 15 placed around the hinge axis 14 and serving as a biasing member, in its closing direction in which the nut exit 11 is closed with a predetermined bias force. The door 12 is formed with a notch 12a which is open upward and through which a later-described small-diameter front-end portion 3a of the feed rod 3 can pass.

<Nut Delivery Unit>

The nut chute 2 serving as a nut delivery unit is tubular, and its lower end is connected through a coupler 16 to the nut receiver 1 while its upper end is connected to a nut sorter (not shown). The nut sorter sorts nuts N to remove nuts having a larger diameter than a normal nut to be welded, properly orients the sorted nuts N and then feeds the properly oriented nuts N to the nut chute 2. Then, the nut chute 2 successively feeds the fed nuts N to a nut receiving chamber (nut receiving position) 9 of the nut receiver 1 while the screw hole of each nut is horizontally oriented.

<Feed Rod>

As illustrated in FIG. 1, the feed rod 3 is inserted into a guide tube 5 whose front end is coupled to the nut receiver 1. As illustrated in FIG. 3, the feed rod 3 is formed at its front end with a small-diameter front-end portion 3a insertable into the screw hole of each nut N, and a shoulder (engagement portion) 3b of the feed rod 3 is formed between the small-diameter front-end portion 3a and a large-diameter basal portion thereof.

<Rod Driver>

As illustrated in FIG. 1, a two-stage cylinder (tandem cylinder) serving as a rod driver 4 is coupled to the basal end of the guide tube 5 coaxially with the guide tube 5. The two-stage cylinder is configured such that a long stroke double-acting cylinder 21 forming a front portion of the two-stage cylinder is connected in series to a short stroke single-acting cylinder 22 forming a rear portion thereof. The back end of the feed rod 3 is coupled to a piston 23 of the double-acting cylinder 21. A piston rod 24 of the single-acting cylinder 22 is configured to pass through the back end of the double-acting cylinder 21 and be in contact with the piston 23 of the double-acting cylinder 21. The double-acting cylinder 21 is provided at its front and back end parts with supply/delivery members 25 and 26 through which working pressure (air pressure) is supplied to the double-acting cylinder 21 and delivered out of the double-acting cylinder 21, and the single-acting cylinder 22 is provided at its back end part with a supply/delivery member 27 through which working pressure is supplied to the single-acting cylinder 22 and delivered out of the single-acting cylinder 22. The single-acting cylinder 22 is set to have a lower working pressure than the double-acting cylinder 21.

Figure 4A:
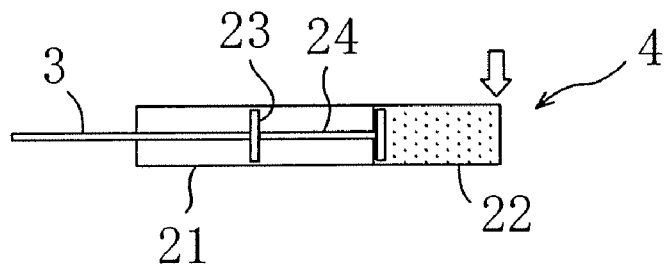
FIG. 4A is a diagram illustrating the state of a rod driver during standby.
Figure 4B:
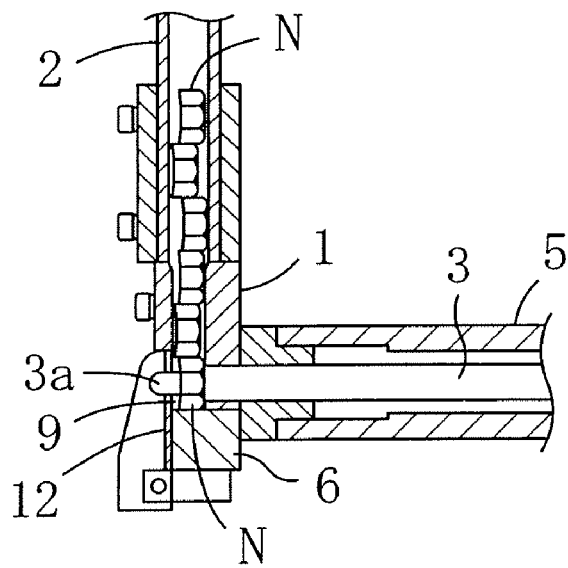
FIG. 4B is a diagram illustrating the state of the nut receiving part during standby under normal conditions.

The rod driver 4 is configured such that in the standby state, working pressure is supplied only to the single-acting cylinder 22 forming a rear portion of the two-stage cylinder as illustrated in FIG. 4A. The piston rod 24 of the single-acting cylinder 22 pushes the piston 23 of the double-acting cylinder 21 forward, and thus, as illustrated in FIG. 4B, only the small-diameter front-end portion 3a of the feed rod 3 enters the nut receiving chamber (nut receiving position) 9.

Figure 5A:
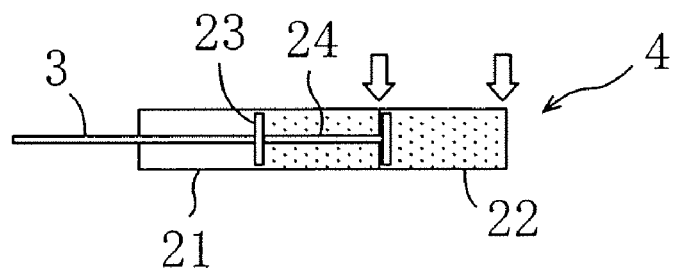
FIG. 5A is a diagram illustrating the state of the rod driver when the nut feeder has been set in motion.
Figure 5B:
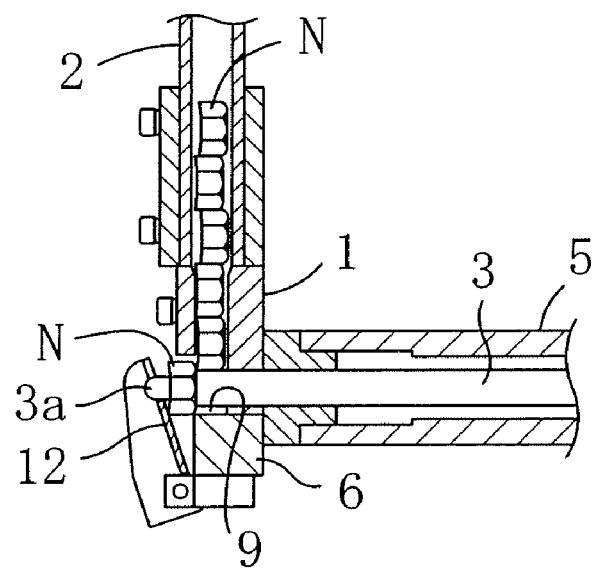
FIG. 5B is a diagram illustrating the state of the rod driver under normal conditions when the nut feeder has been set in motion.
Figure 6A:
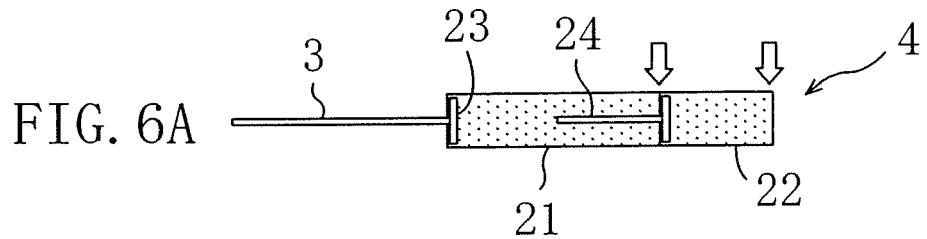
FIG. 6A is a diagram illustrating the state of the rod driver when a nut has been fed normally.
Figure 6B:
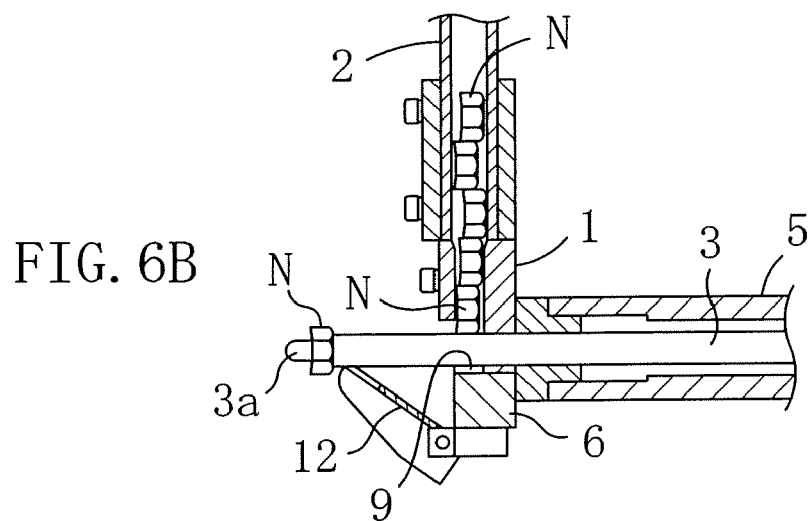
FIG. 6B is a diagram illustrating the state of the nut receiving part when a nut has been fed normally.

When the rod driver 4 receives an actuation signal from a controller (not shown) during standby, working pressure is supplied not only to the single-acting cylinder 22 but also to the double-acting cylinder 21 through the back end of the double-acting cylinder 21 as illustrated in FIG. 5A. In this manner, the feed rod 3 moves forward as illustrated in FIGS. 5B and 6B.

Figure 7A:
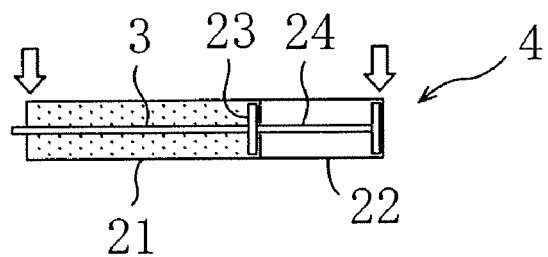
FIG. 7A is a diagram illustrating the state of the rod driver when a feed rod has moved backward.
Figure 7B:
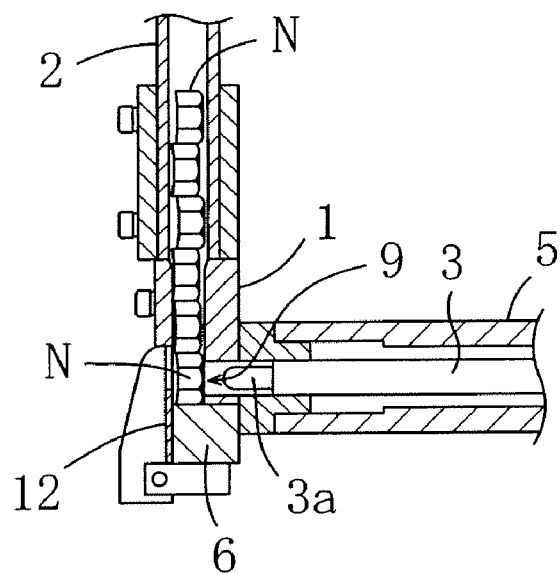
FIG. 7B is a diagram illustrating the state of the nut receiving part to which a normal nut has been delivered when the feed rod has moved backward.
Figure 7C:
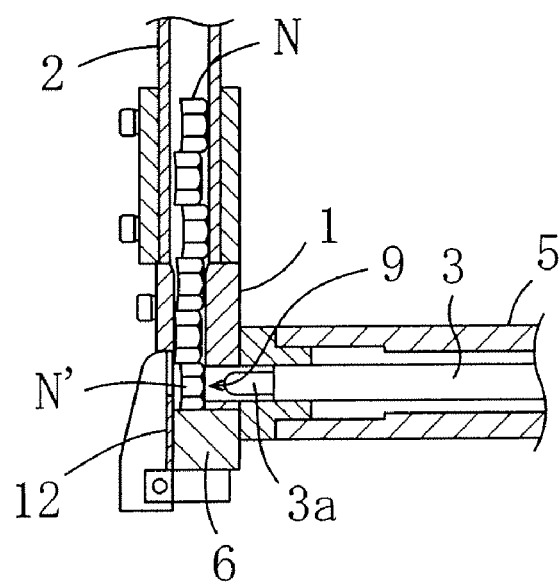
FIG. 7C is a diagram illustrating the state of the nut receiving part to which an abnormal nut has been delivered when the feed rod has moved backward.

When the feed rod 3 reaches the forward end of its stroke, the end of the double-acting cylinder 21 through which working pressure is supplied to the double-acting cylinder 21 is switched from the back end to the front end as illustrated in FIG. 7A. Thus, the feed rod 3 moves backward. The working pressure supplied to the double-acting cylinder 21 is higher than the working pressure supplied to the single-acting cylinder 22. This allows the piston rod 24 of the single-acting cylinder 22 to be pushed by the piston 23 of the double-acting cylinder 21 and thus move backward. As illustrated in FIG. 7B, the small-diameter front-end portion 3a moves behind the nut receiving chamber 9.

When the feed rod 3 reaches the backward end of its stroke, the supply of the working pressure to the double-acting cylinder 21 is stopped as illustrated in FIG. 4A. Thus, working pressure is supplied only to the single-acting cylinder 22. In this manner, the feed rod 3 moves forward so as to be put on standby as illustrated in FIG. 4B and stops.

<Actuation for Feeding Nuts (Under Normal Conditions)>

In the standby state illustrated in FIGS. 4A and 4B, nuts N delivered by the nut chute 2 are received in the nut receiving chamber 9 with their screw holes oriented horizontally. In the exemplary figures, a plurality of nuts N are vertically aligned from the nut receiving chamber 9 to the nut chute 2. Since working pressure is supplied only to the single-acting cylinder 22, the feed rod 3 is stopped with its small-diameter front-end portion 3a entering into the screw hole of the nut N in the nut receiving chamber 9 and further projecting forward through the notch 12a of the door 12.

When an actuation signal is given to the rod driver 4, working pressure is supplied to the double-acting cylinder 21 through the back end of the double-acting cylinder 21 as illustrated in FIG. 5A. Thus, as illustrated in FIG. 5B, the feed rod 3 starts moving forward. This process step is the forward movement step in which the feed rod 3 moves forward. In this forward movement step, the nut N in the nut receiving chamber 9 pushes the door 12 against the bias force of the kick spring 15 and thus moves forward from the nut receiving chamber 9. Then, as illustrated in FIG. 6B, the door 12 is further pushed and opened, and the nut N is fed to the intended position by the feed rod 3.

When the nut N reaches the intended position, the end of the double-acting cylinder 21 through which working pressure is supplied to the double-acting cylinder 21 is switched from the back end to the front end as illustrated in FIG. 7A. Thus, the feed rod 3 moves backward. This process step is the backward movement step in which the feed rod 3 moves backward. As illustrated in FIG. 7B, the feed rod 3 moves backward to allow its small-diameter front-end portion 3a to exit from the nut receiving chamber 9. In this manner, the subsequent nut N is received in the nut receiving chamber 9.

Next, as illustrated in FIG. 4A, the supply of working pressure to the double-acting cylinder 21 is stopped so that the working pressure is supplied only to the single-acting cylinder 22. Thus, the feed rod 3 moves forward, and in the standby state illustrated in FIG. 4B, its small-diameter front-end portion 3a enters into the screw hole of the nut N in the nut receiving chamber 9. The above-mentioned process step is the standby step in which the feed rod 3 is on standby.

<Actuation for Feeding Nuts (Under Abnormal Conditions)>

Figure 4C:
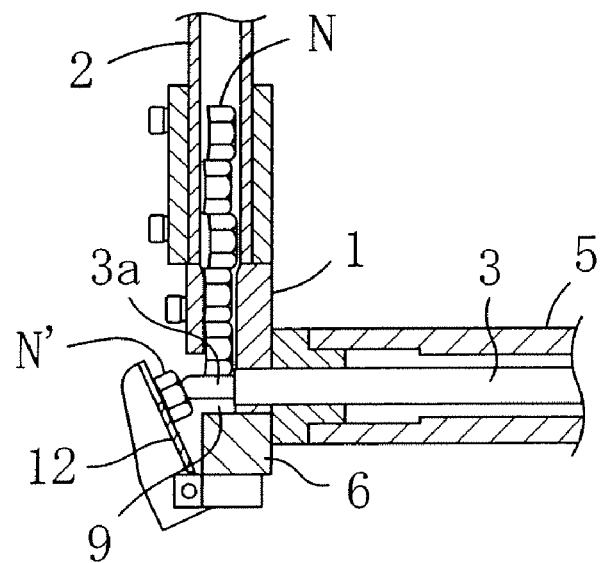
FIG. 4C is a diagram illustrating the state of the nut receiving part during standby under abnormal conditions.

A description will be given of the case where, with the backward movement of the feed rod 3, an abnormal nut N' whose screw hole has a smaller diameter than the small-diameter front-end portion 3a of the feed rod 3 is received in the nut receiving chamber 9. In this case, even when the feed rod 3 moves forward to enter into the standby state, the small-diameter front-end portion 3a cannot be inserted into the screw hole. Accordingly, as illustrated in FIG. 4C, the abnormal nut N' is pushed out forward from the nut receiving chamber 9 by the feed rod 3.

Figure 8:
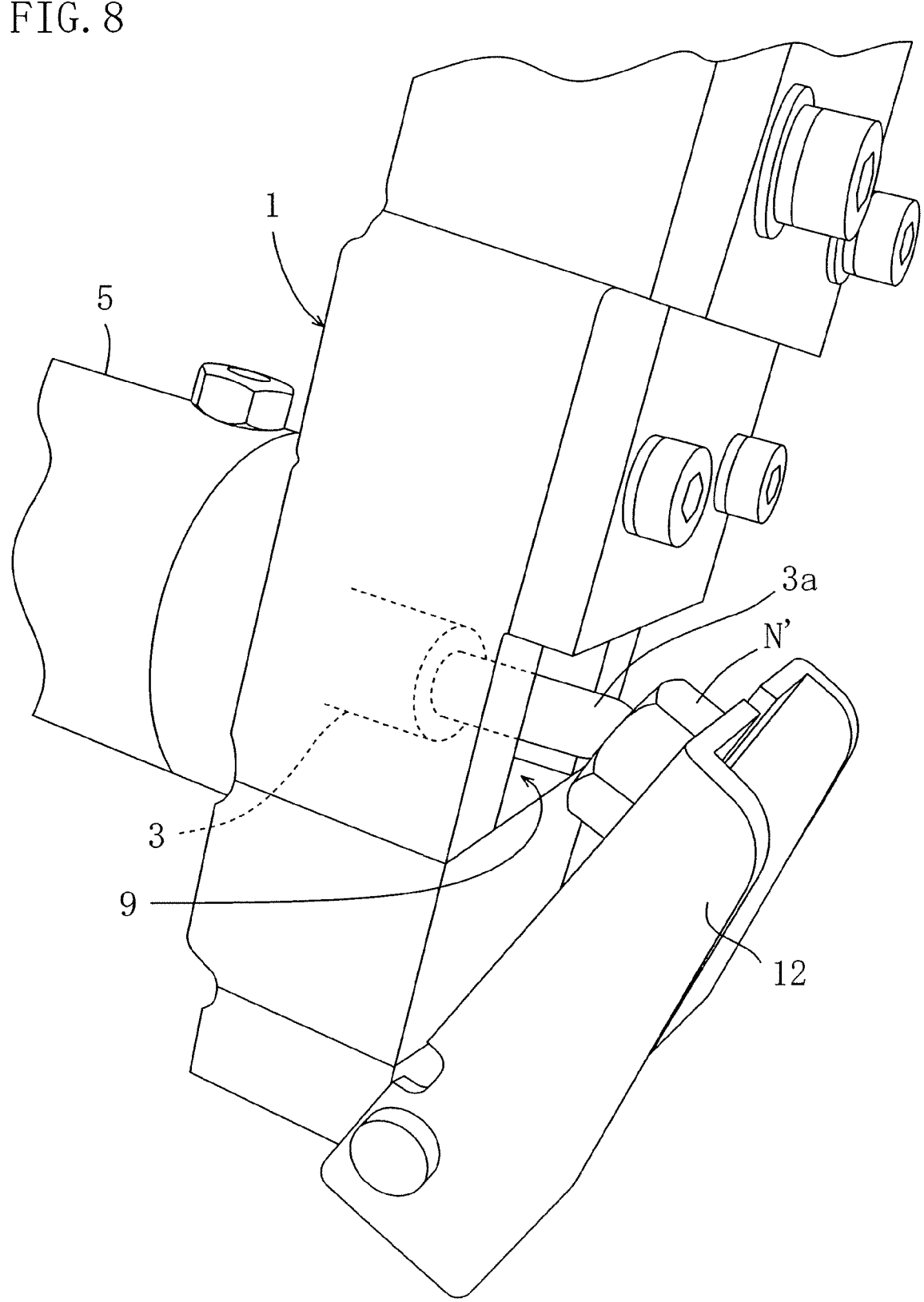
FIG. 8 is a perspective view illustrating the state in which an abnormal nut is sandwiched between the feed rod and a door.

In the above-mentioned case, the feed rod 3 pushes the abnormal nut N' out of the nut receiving chamber 9 and enters into the standby state (stops). Meanwhile, since the door 12 is biased in its closing direction by the kick spring 15, the abnormal nut N' is sandwiched between the small-diameter front-end portion 3a of the feed rod 3 and the half-open door 12 as illustrated in FIG. 8. More particularly, the abnormal nut N' is not flicked forward by the feed rod 3 and is held by the feed rod 3 and the door 12. This prevents abnormal nuts from exiting from the nut receiving chamber 9 and being scattered over the surrounding area.

Figure 5C:
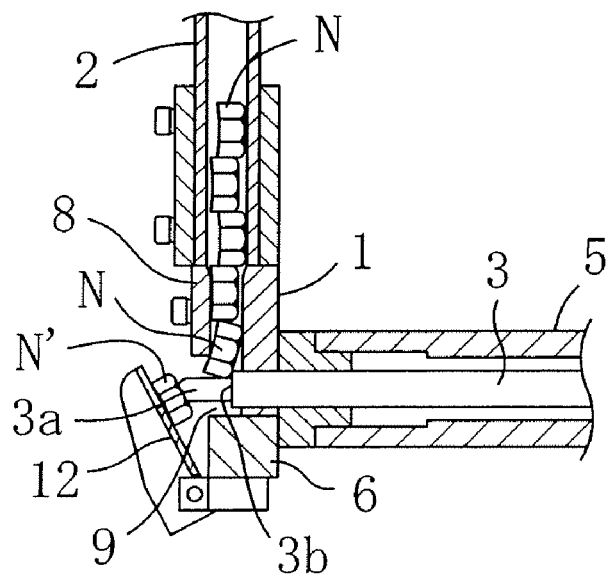
FIG. 5C is a diagram illustrating the state of the rod driver under abnormal conditions when the nut feeder has been set in motion.

The nut N subsequent to the abnormal nut N' is caught on the periphery of the small-diameter front-end portion 3a of the feed rod 3. When, under such conditions, an actuation signal is given to the rod driver 4, working pressure is supplied to the double-acting cylinder 21 through the back end of the double-acting cylinder 21 as illustrated in FIG. 5A. Consequently, the feed rod 3 attempts to move forward. Under such conditions, the shoulder (engagement portion) 3b between the small-diameter front-end portion 3a of the feed rod 3 and the large-diameter basal portion continuous with the small-diameter front-end portion 3a engages with the edge of the subsequent nut N (FIG. 5C).

Figure 6C:
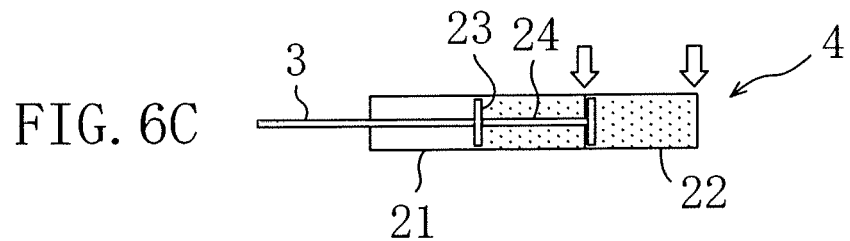
FIG. 6C is a diagram illustrating the state of the rod driver when an abnormality has occurred during the feed of a nut.
Figure 6D:
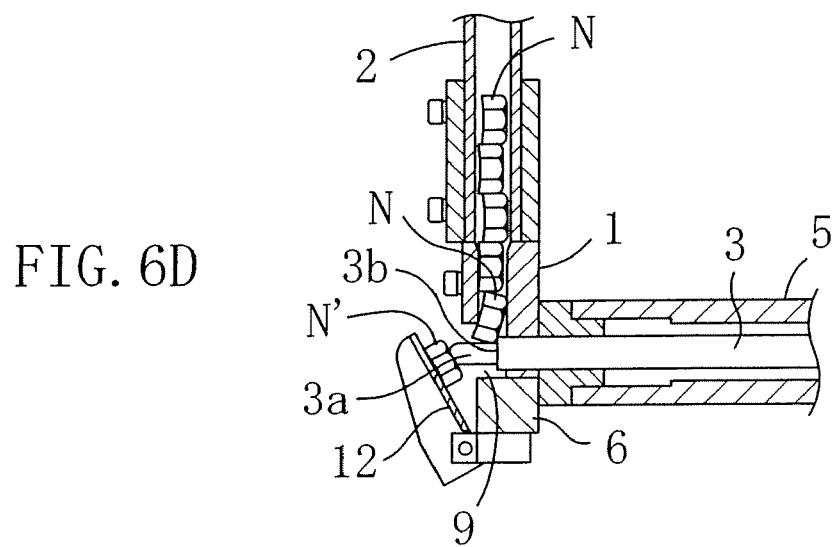
FIG. 6D is a diagram illustrating the state of the nut receiving part when an abnormality has occurred during the feed of a nut.

The height of the lower end of the front plate 8 (the height of the upper end of the nut exit 11 of the nut receiving chamber 9) is set to prevent a nut N from passing through the gap between the feed rod 3 and the front plate 8 and moving forward. Therefore, the feed rod 3 engaging with the subsequent nut N is blocked by the subsequent nut N independently of the output of the actuation signal so as to be prevented from moving forward (FIGS. 6C and 6D). In other words, the feed rod 3 is locked.

In view of the above, the abnormal nut N' sandwiched between the feed rod 3 and the door 12 is removed, and then the feed rod 3 can be returned to the standby state by a reset switch (not shown). More particularly, with the throwing of the reset switch, the end of the double-acting cylinder 21 through which working pressure is supplied to the double-acting cylinder 21 is switched from the back end to the front end, and thus the feed rod 3 moves behind the nut receiving chamber 9. Consequently, the subsequent nut N is received in the nut receiving chamber 9 (the state illustrated in FIG. 7B). Next, the supply of working pressure to the double-acting cylinder 21 is stopped, and the function of the single-acting cylinder 22 allows the feed rod 3 to move forward. Thus, the small-diameter front-end portion 3a enters the screw hole of the nut N in the nut receiving chamber 9 so that the feed rod 3 enters into the standby state illustrated in FIG. 4B.

What is important is as follows: On condition that there is an abnormal nut N', the feed rod 3 engages with the subsequent nut N not in the dynamic state in which it is moving forward, but when the feed rod 3 attempts to further move forward from the static state in which the previous nut has been pushed out so that the feed rod has been on standby, i.e., in which the feed rod has been stopped.

More particularly, in a case where the shoulder 3b engages with the edge of the subsequent nut N in the dynamic state in which the feed rod 3 is moving forward, the subsequent nut N may be flicked upward due to the momentum of the forward movement of the feed rod 3, and thus the feed rod 3 may move forward as it is. On the other hand, in the above-described embodiment, when the feed rod 3 attempts to further move forward from the state in which it has been stopped, it engages with the subsequent nut N. This prevents the nut N from being flicked upward by the feed rod 3 in the engagement of the feed rod 3. In view of the above, the feed rod 3 and the nut N engage with each other with reliability.

<Another Embodiment>

In the above-described embodiment, when there is an abnormal nut N', the engagement of the feed rod 3 with the subsequent nut N prevents the feed rod 3 from moving forward. However, in this embodiment, an abnormality detector is provided to stop the actuation of a rod driver 4.

Figure 9:
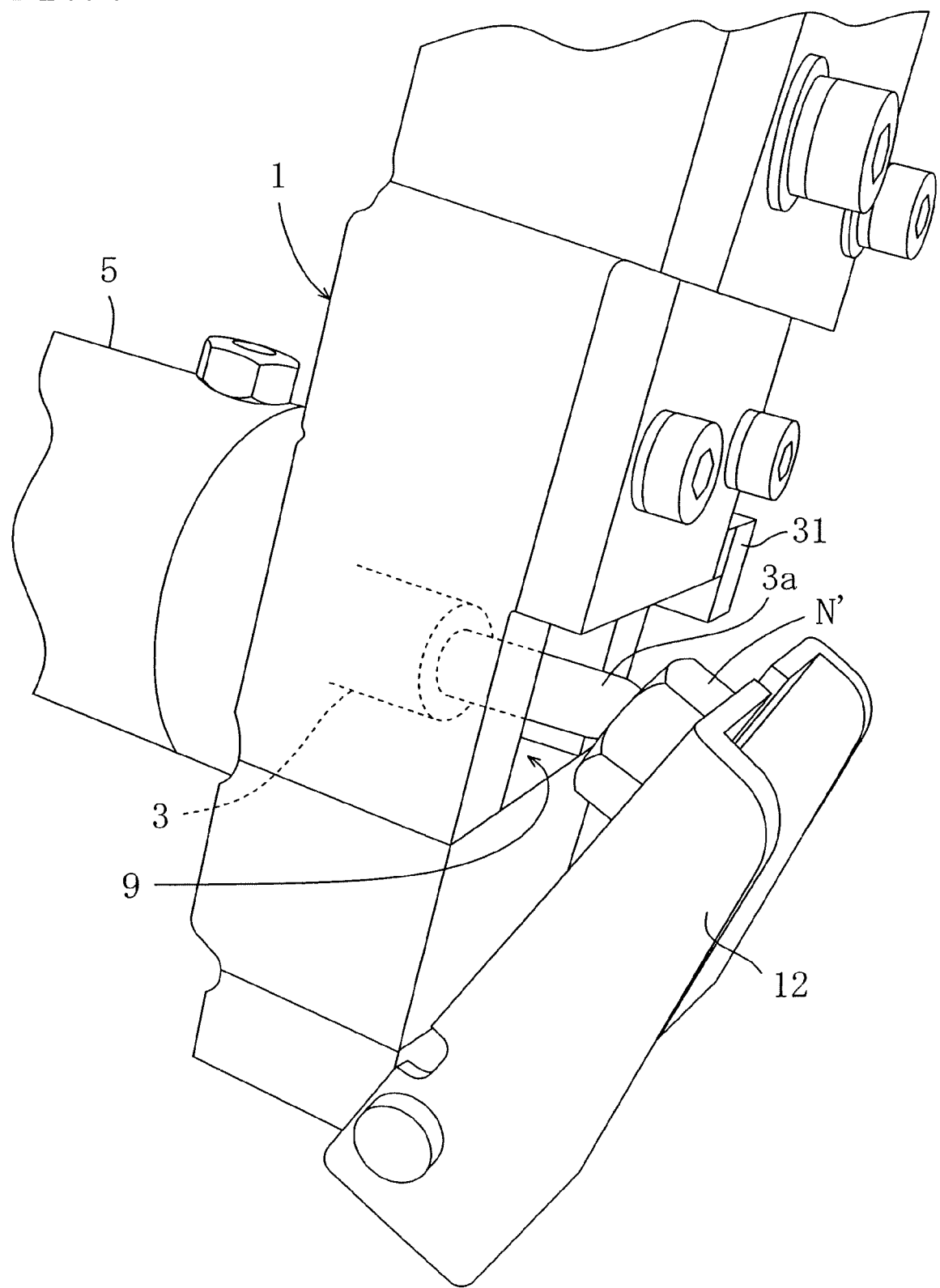
FIG. 9 is a perspective view illustrating the same state as in FIG. 8 according to another embodiment.

More particularly, in FIG. 9, reference numeral 31 denotes a proximity switch serving as the abnormality detector and outputting a door opening signal when a door 12 moves forward away from a channel member 7. Thus, on condition that the rod driver 4 is on standby, if a door opening signal is output from the proximity switch 31, a controller (not shown) outputs a actuation-stopping signal for stopping the actuation of the rod driver 4 to the rod driver 4. The door opening signal output during the standby state in the above-mentioned case represents a signal for detecting the ejection of an abnormal nut N'.

In view of the above, when the abnormal nut N' is ejected during the standby state, the actuation of the rod driver 4 is stopped, and the feed rod 3 is prevented form moving forward. Therefore, like the above-described embodiment, the abnormal nut N' sandwiched between the feed rod 3 and the door 12 is removed, thereby putting the feed rod 3 on standby again.

In the above-described embodiment, a two-stage cylinder is adopted as the rod driver 4. However, only one double-acting cylinder may be adopted as the rod driver 4. In this case, a spring may be inserted into the back end of the cylinder and, in the backward movement step for the feed rod 3, compressed to move a small-diameter front-end portion 3a thereof behind a nut receiving chamber 9. Then, the feed rod may be put on standby by allowing the bias force of the spring to move the feed rod forward. Various cylinders having an intermediate stop function, such as a telescope-type cylinder, or a motor-operated cylinder can be adopted instead, and the type of the cylinder to be adopted as the rod driver 4 is not limited.

A component that when an abnormal nut N' is pushed out of a nut receiving chamber 9 by a feed rod 3 and thus a door 12 is half-open, responds to the half-open door 12 may be adopted as the proximity switch serving as the abnormality detector. A component, such as a limit switch for detecting the opening of the door 12 may be adopted instead. The type of the component to be adopted as the proximity switch is not limited.

What is claimed is:

1. A nut feeder comprising:

a nut delivery unit for delivering a nut;

a nut receiver for receiving the nut delivered by the nut delivery unit;

a feed rod which includes a small-diameter front-end portion insertable into the screw hole of the nut, whose forward movement allows the nut in the nut receiver to be fed to an intended position, and in which, in a standby state for feeding the nut to the intended position, the small-diameter front-end portion of the feed rod enters a nut receiving position in the nut receiver so as to be inserted into the screw hole of the nut received in the nut receiver and is then stopped; and a rod driver for moving the feed rod forward from the standby state to feed the nut to the intended position, subsequently moving the feed rod behind the nut receiving position in order to receive the next nut from the nut delivery unit in the nut receiver, and subsequently moving the feed rod forward again to enter into the standby state and then stopping the feed rod, wherein the feed rod is provided with an engagement portion for, when the small-diameter front-end portion of the feed rod pushes the nut in the nut receiver out forward without being inserted into the screw hole of the nut so that the feed rod enters into the standby state, engaging with the nut subsequent to the pushed-out nut to prevent the feed rod from further moving forward from the standby state.

2. The nut feeder of claim 1 further comprising a door which can be opened by pivoting forward, the door closing a nut outlet through which a nut is fed to the intended position, wherein the door is designed such that:

the door is biased, with a predetermined bias force, in its closing direction and can be opened forward by the push of the nut against the door when the forward movement of the feed rod allows the nut to move forward, when the small-diameter front-end portion of the feed rod pushes the nut in the nut receiver out forward without being inserted into the screw hole of the nut so that the feed rod enters into the standby state, the bias force given to the door allows the nut to be held while being sandwiched between the door and the small-diameter front-end portion of the feed rod.

3. A nut feeder comprising:

a nut delivery unit for delivering a nut;

a nut receiver for receiving the nut delivered by the nut delivery unit;

a feed rod which includes a small-diameter front-end portion insertable into the screw hole of the nut, whose forward movement allows the nut in the nut receiver to be fed to an intended position, and in which, in a standby state for feeding the nut to the intended position, the small-diameter front-end portion of the feed rod enters a nut receiving position in the nut receiver so as to be inserted into the screw hole of the nut received in the nut receiver and is then stopped;

a rod driver for moving the feed rod forward from the standby state to feed the nut to the intended position, subsequently moving the feed rod behind the nut receiving position in order to receive the next nut from the nut delivery unit in the nut receiver, and subsequently moving the feed rod forward again to enter into the standby state and then stopping the feed rod; and an abnormality detector for, when the feed rod enters into the standby state, detecting whether or not the nut in the nut receiver is pushed out forward by the feed rod, wherein when the pushing out of the nut is detected by the abnormality detector, the actuation of the rod driver is stopped.

4. A nut feeder comprising:

a nut delivery unit for delivering a nut;

a nut receiver for receiving the nut delivered by the nut delivery unit;

a feed rod which includes a small-diameter front-end portion insertable into the screw hole of the nut, whose forward movement allows the nut in the nut receiver to be fed to an intended position, and in which, in a standby state for feeding the nut to the intended position, the small-diameter front-end portion of the feed rod enters a nut receiving position in the nut receiver so as to be inserted into the screw hole of the nut received in the nut receiver and is then stopped; and a rod driver means for moving the feed rod forward from the standby state to feed the nut to the intended position, subsequently moving the feed rod behind the nut receiving position in order to receive the next nut from the nut delivery unit in the nut receiver, and subsequently moving the feed rod forward again to enter into the standby state and then stopping the feed rod, wherein the feed rod is provided with an engagement portion means for, when the small-diameter front-end portion of the feed rod pushes the nut in the nut receiver out forward without being inserted into the screw hole of the nut so that the feed rod enters into the standby state, engaging with the nut subsequent to the pushed-out nut to prevent the feed rod from further moving forward from the standby state.

* * * * *